United States Patent [19]

Mackay et al.

[11] Patent Number: 4,976,530
[45] Date of Patent: Dec. 11, 1990

[54] SUNGLASSES WITH VISOR

[75] Inventors: Frederick G. Mackay, Tarzana, Calif.; William J. Wichman, 702 Brownsage Dr., Glendora, Calif. 91740

[73] Assignee: William John Wichman, Glendora, Calif.

[21] Appl. No.: 325,141

[22] Filed: Mar. 17, 1989

Related U.S. Application Data

[63] Continuation-in-part of Ser. No. 212,427, Jun. 28, 1988, abandoned.

[51] Int. Cl.$^5$ .............................................. G02C 7/10
[52] U.S. Cl. ......................................... 351/44; 2/13; 351/47
[58] Field of Search .................... 351/44, 45, 47; 2/13, 2/426

[56] References Cited

U.S. PATENT DOCUMENTS

| | | |
|---|---|---|
| D. 211,413 | 6/1968 | Mitchell . |
| D. 281,507 | 11/1985 | Schremmer . |
| D. 294,592 | 3/1988 | Wilson . |
| D. 295,286 | 4/1988 | Takeuchi . |
| 2,527,027 | 10/1950 | Mull . |
| 4,264,988 | 5/1981 | Specht . |
| 4,271,538 | 6/1981 | Montesi et al. . |
| 4,610,036 | 9/1986 | LaPrairie . |
| 4,674,851 | 6/1987 | Jannard . |
| 4,730,915 | 3/1988 | Jannard ................................ 351/44 |

OTHER PUBLICATIONS

New Equipment Digest, Sep. 9, 1968, p. 92, M—A.
Visitor Goggle, copy in "Spectacles", publication boxes, group 290.
Hong Kong Enterprise, Jul. 1988, p. 150, Francini frames labelled Nos. 3–5, copy in D16–107.
Coca Cola Heatwave Sunglasses, 1987.

*Primary Examiner*—Paul M. Dzierzynski
*Attorney, Agent, or Firm*—Christie, Parker & Hale

[57] ABSTRACT

Plastic sunglasses comprise a transparent lens piece, a pair of temple pieces attached to the ends of the lens piece, and an opaque visor which snap-locks onto the top of the lens piece. The visor has a long curved front face with L-shaped ends, an angular top face for projecting inwardly across the top of the lens piece, and separate hooks projecting inwardly from the inner ends of the visor behind corresponding L-shaped shoulders. A visor connector at the top of the lens piece includes a curved upright wall with generally L-shaped ends. The wall is recessed from a curved ridge with generally L-shaped ends extending across the front of the lens piece. The opposite ends of the visor connector include L-shaped slots in its bottom front face which interlock with the L-shaped shoulders on the bottom inside face of the visor. The visor is interlocked with the visor connector by engaging the shoulder at one end of the visor with a corresponding slot on the lens piece, engaging the hook at the opposite end of the visor with a rear edge of the lens connector wall, and pressing down on the opposite end of the visor so the hook and shoulder move downwardly and apply tension to the end of the visor until the shoulder in front of the hook snap-locks into the slot at the opposite end of the visor connector.

25 Claims, 11 Drawing Sheets

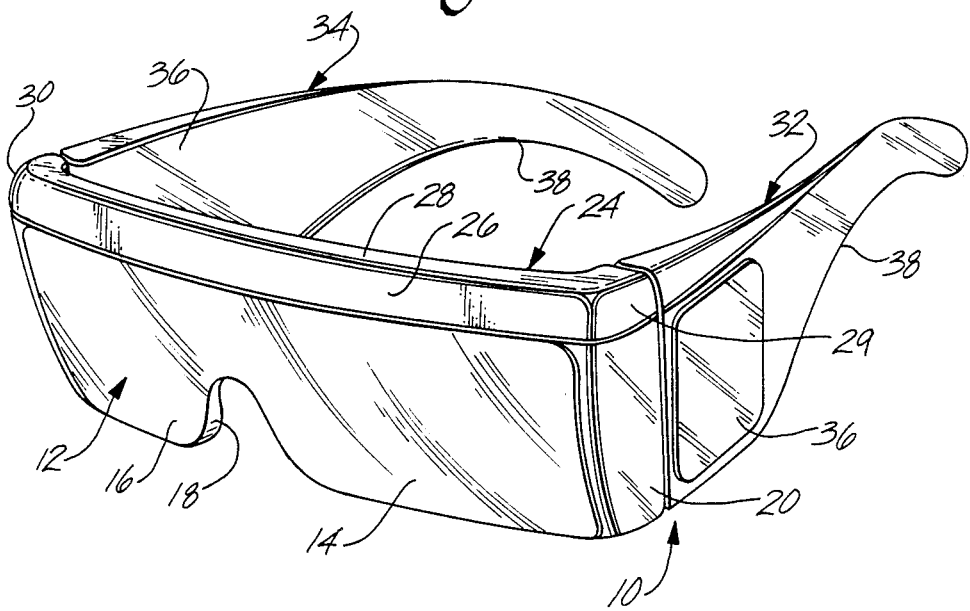
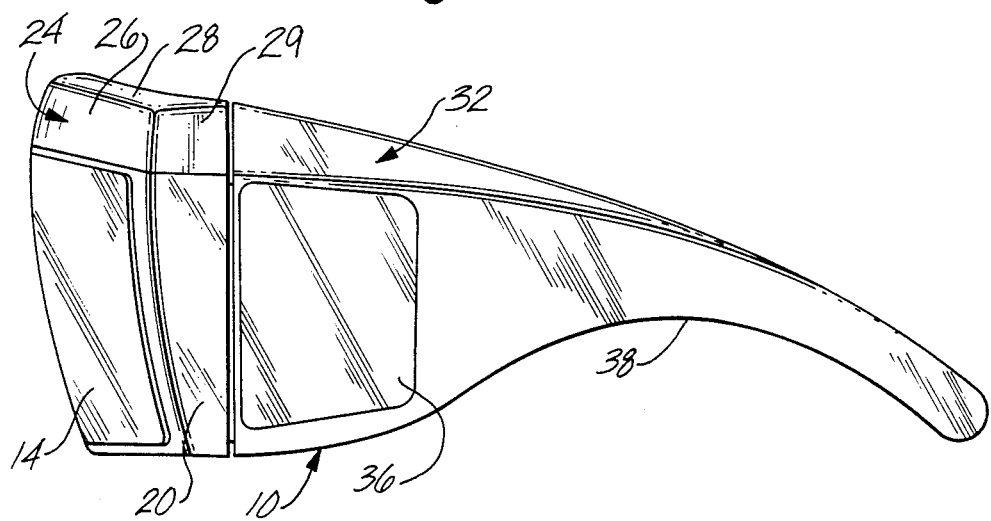

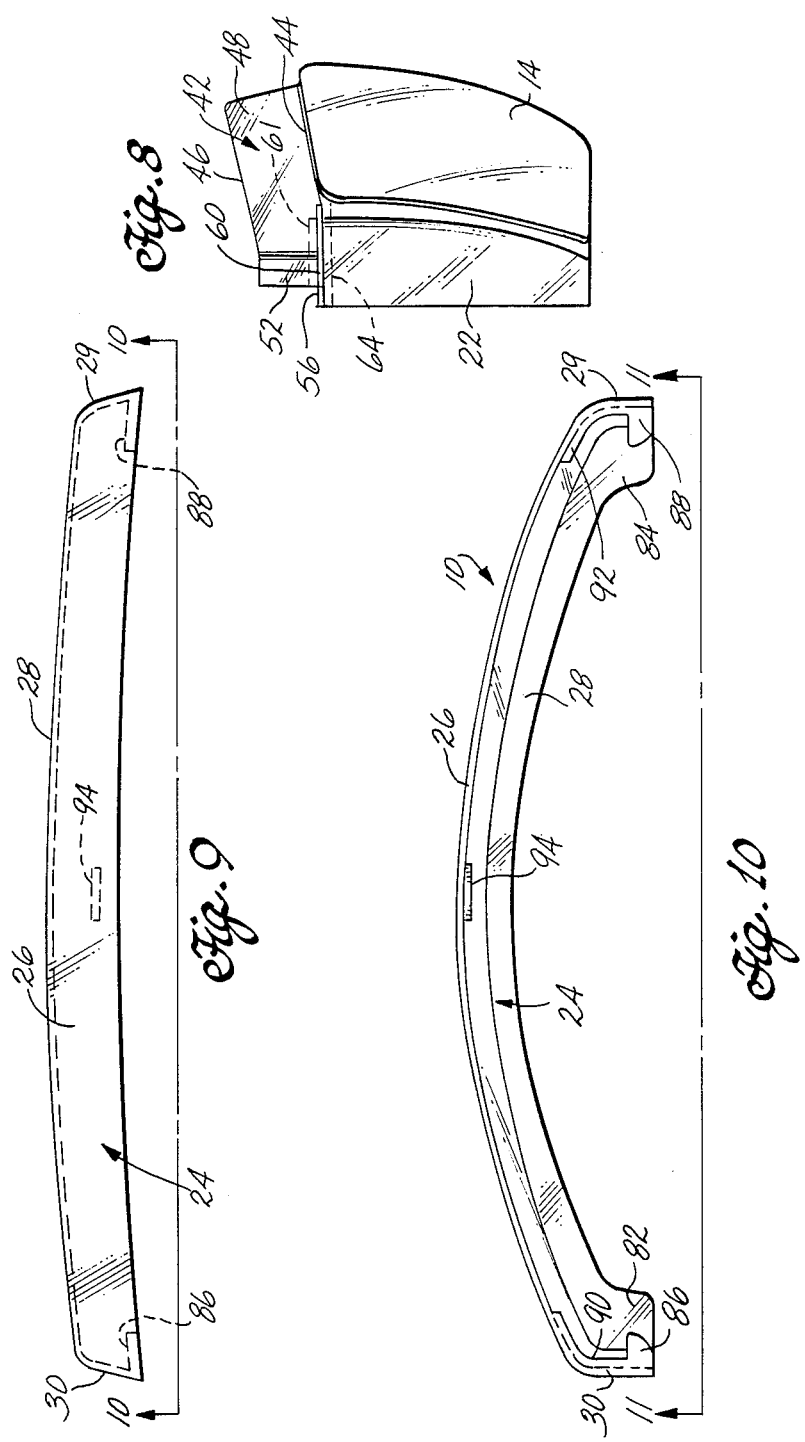

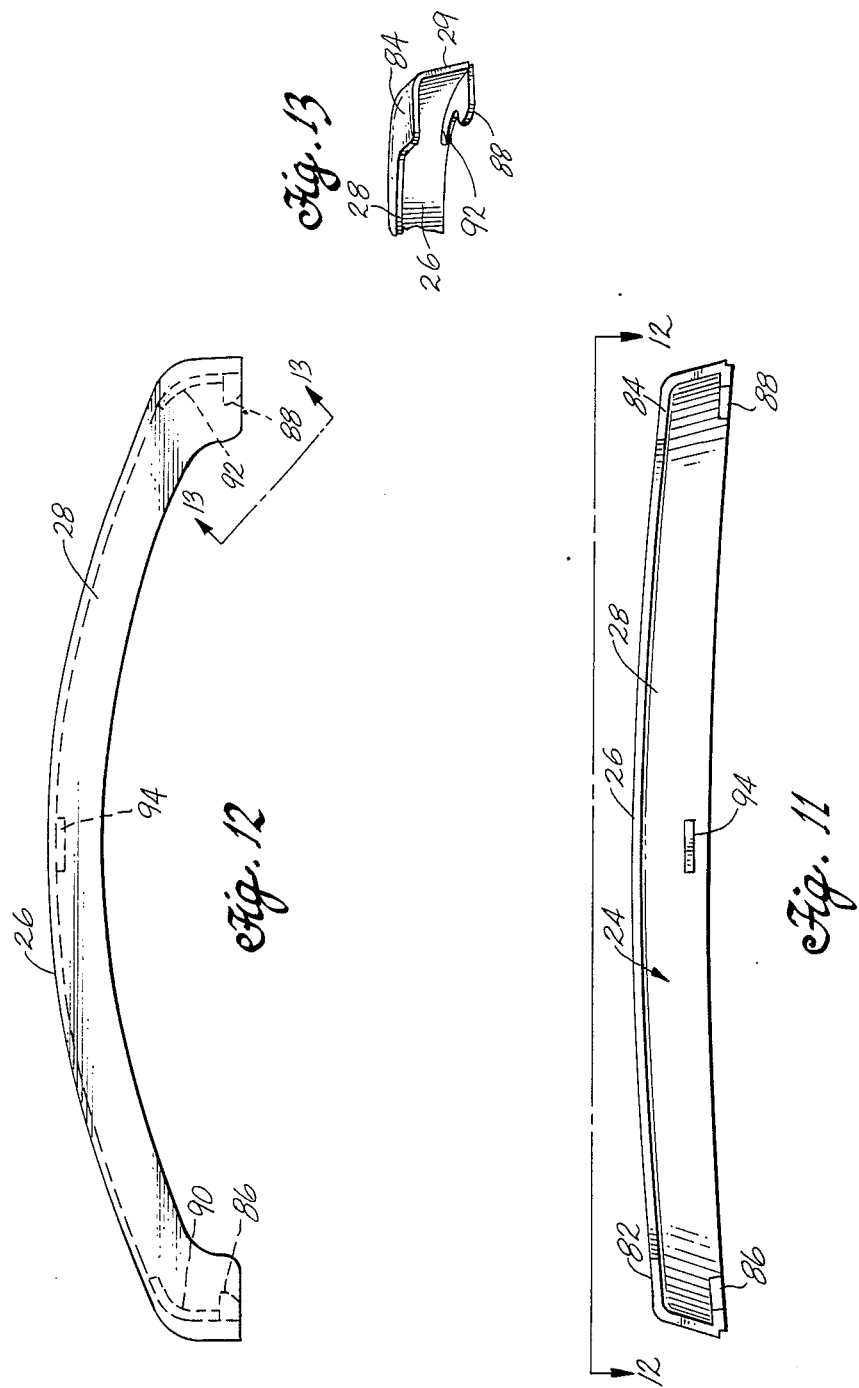

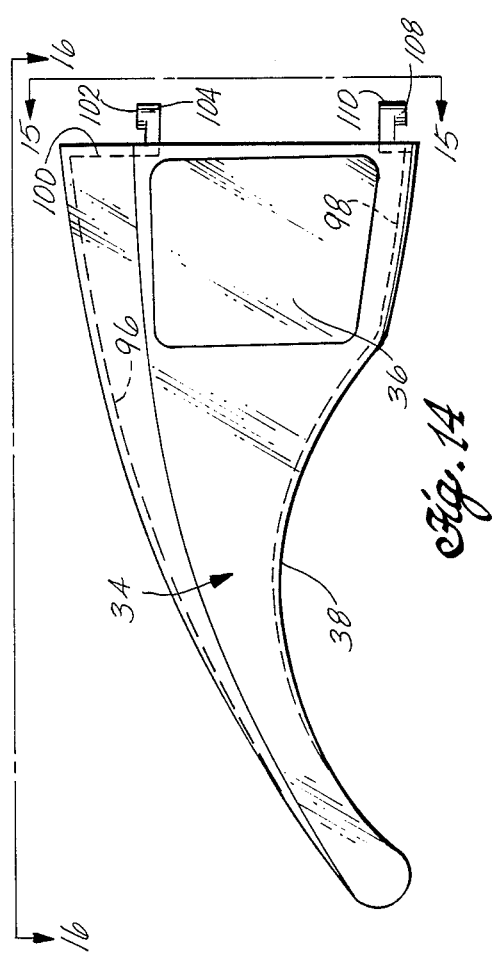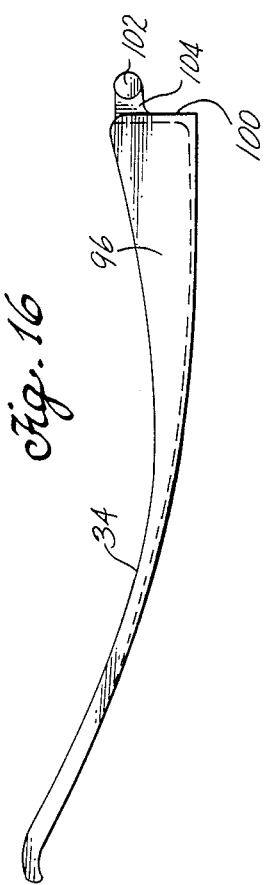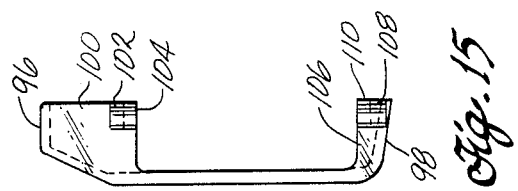

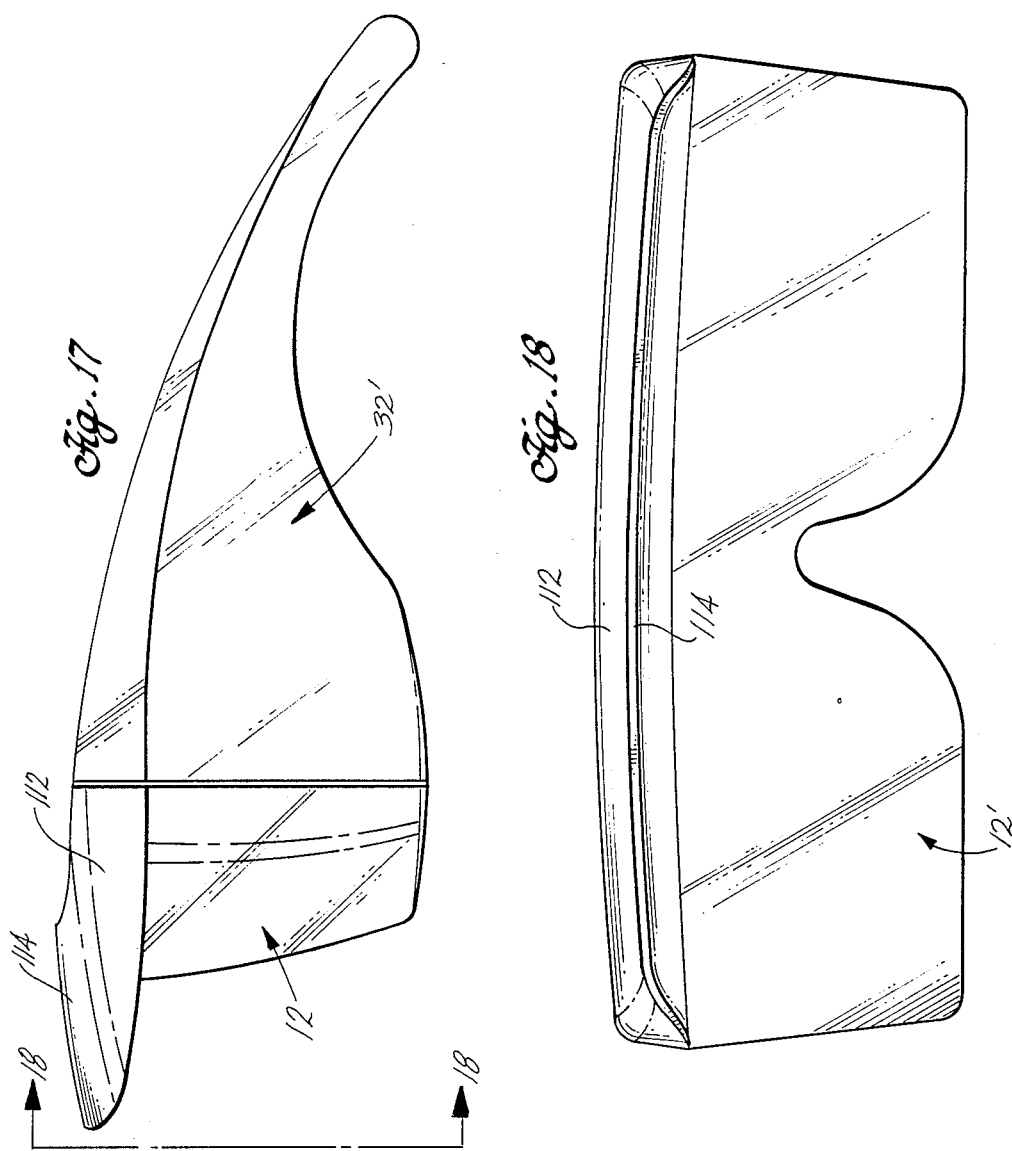

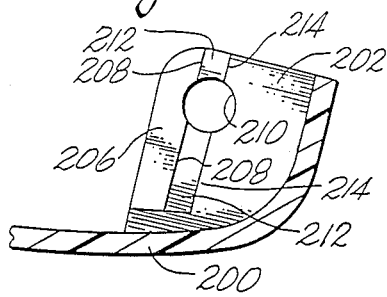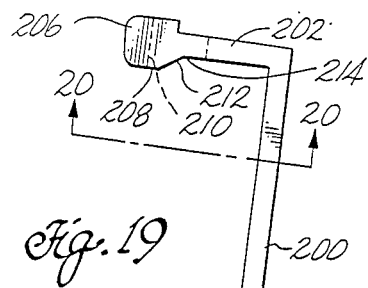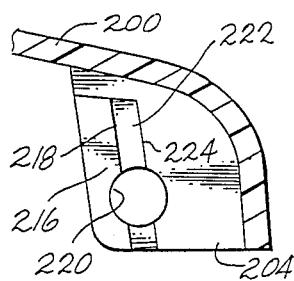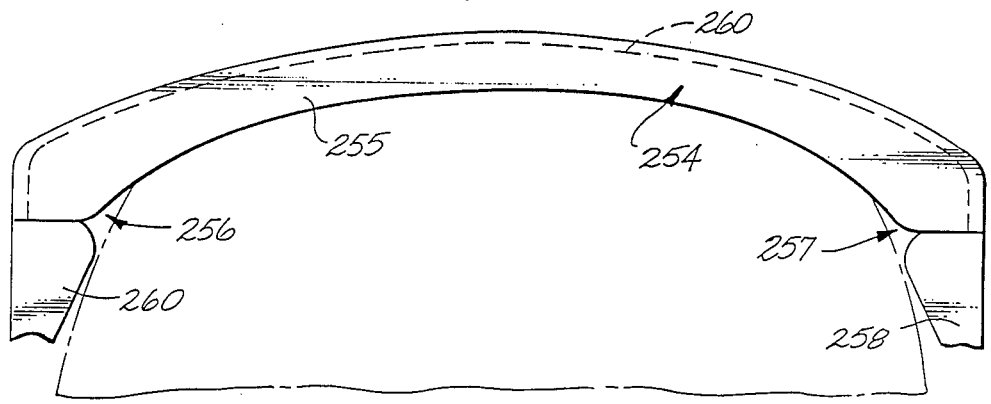

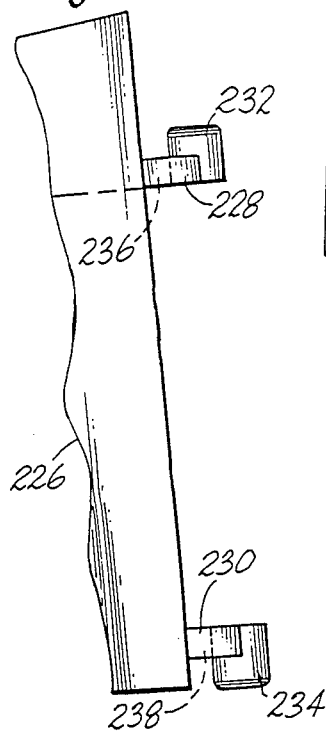
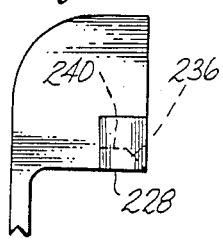
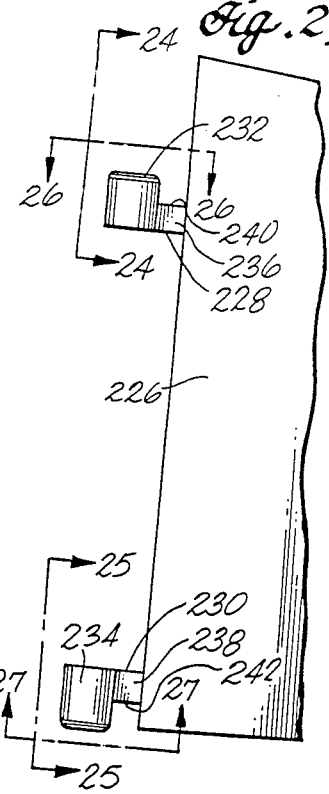
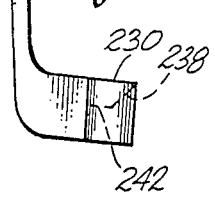
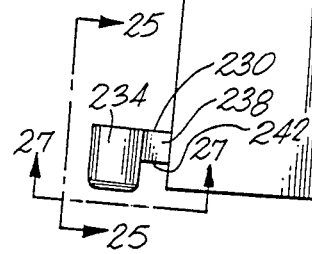
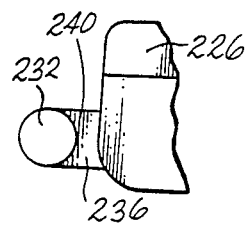
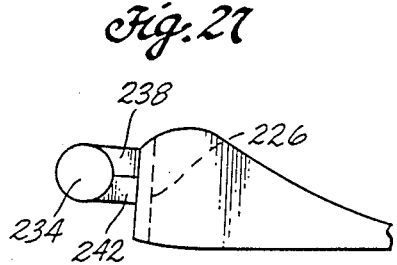

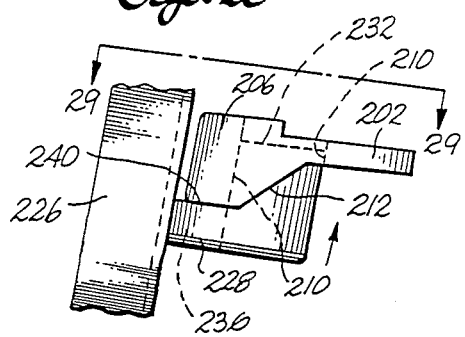
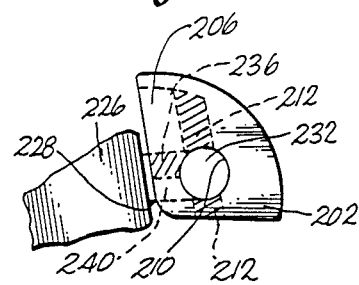
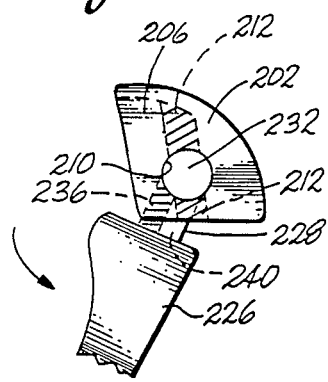
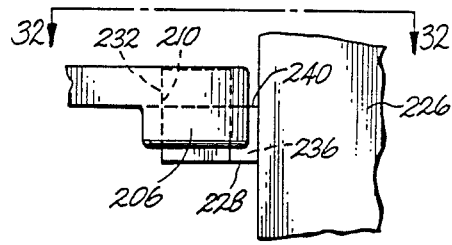
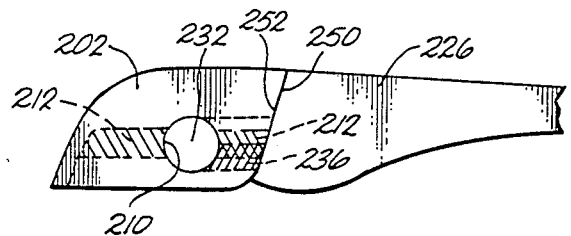

SUNGLASSES WITH VISOR

CROSS-REFERENCE

This is a continuation-in-part of application Ser. No. 212,427, filed June 28, 1988 and now abandoned.

FIELD OF THE INVENTION

This invention relates to eyewear, and more particularly, to plastic sunglasses having a releasably interlocking opaque visor.

BACKGROUND OF THE INVENTION

Plastic sunglasses in the past have been made in various styles to intercept light along the top and around the sides of the glasses. Wraparound sunglasses are an example of glasses which can intercept the light at the sides of the glasses. Light rays which can enter the user's eyes from above can create extreme discomfort.

The present invention provides plastic sunglasses which include a plastic transparent lens piece and a separate opaque visor which snap locks onto the top of the lens piece to block light rays which would otherwise enter the user's eyes from above. The visor has an additional function in that, being a separate piece, it can provide a style statement by using colors that can contrast with or match the color of the transparent lens piece.

In providing such a snap-on visor, the means for attaching the visor to the top of the lens piece can be a difficult problem. There is a need to ensure that the visor is held firmly on the lens piece without easily falling off or becoming loosened, especially during physical activities such as running or skiing, for example. The snap lock feature also should be conducive to easily removing the visor and replacing it with a similar one of a different color without substantial difficulty. It is particularly desirable that such a snap locked visor be interlocked with the top of the lens piece and removed without requiring special tools or the like.

SUMMARY OF THE INVENTION

Briefly, one embodiment of this invention comprises sunglasses which include an elongated unitary lens piece made from a bendable plastic material which is transparent to light passing through an optical area of the lens piece. An elongated visor made from an opaque bendable plastic piece snap locks onto the top of the lens piece. A visor connector at the top of the lens piece includes an upright front wall extending across the front of the lens piece. An elongated ridge extends across the front of the lens piece below the front wall of the visor connector. A pair of slots are formed in the bottom ends of the front wall of the visor connector. The front wall has upright rear edges projecting upwardly above the slots. The visor has an upright front face, with an angular top face projecting inwardly from the front face of the visor. A separate hook at each end of the visor projects inwardly from the front face of the visor, and corresponding shoulders extend inwardly in front of each hook. The visor is interlocked with the visor connector by engaging each shoulder of the visor with corresponding slots on the front wall of the visor connector. Each hook on the visor is engaged with each upright rear edge of the front wall of the visor connector. The front face of the visor overlies the front wall of the visor connector, with the bottom edge of the visor resting on the ridge along the front of the lens piece. The top face of the visor extends over and projects inwardly from the front wall of the visor connector. The top face of the visor extends over the space between the top of the lens piece and the user's face. The opacity of the visor blocks a substantial amount of light rays across the top and upper front portion of the gasses.

The opaque visor can be easily snap locked onto the top of the lens piece. As an example, the hook at one end of the visor can be hooked behind the rear edge of the visor connector wall, with the shoulder in front of the hook disposed in the slot at the end of the visor connector wall. The hook at the opposite end of the visor then can be engaged with the rear edge of the visor connector front wall and the visor pushed downwardly until the shoulder at the opposite end of the visor snap locks into its corresponding slot. This arrangement provides means for quickly and easily attaching or detaching visors to or from the top of the sunglasses. Moreover, the opacity and angular construction of the visor provides substantial blockage of light across the top of the lens piece to provide protection from the vertical light rays, producing a very pronounced comfort level for the user.

In a further embodiment of the invention, the temple pieces are mounted to the ends of the lens piece by a mounting means providing a spring-like snap action when rotating the temple pieces from their folded position to their open position. This mounting means retains the temple pieces under tension in their open position to resist rotation away from the open position so that the user can safely and conveniently put on the sunglasses.

These and other aspects of the invention will be more fully understood by referring to the following detailed description and the accompanying drawings.

BRIEF DESCRIPTION OF THE DRAWINGS

FIG. 1 is a perspective view of sunglasses according to principles of this invention.

FIG. 2 is a side elevation view of the sunglasses shown in FIG. 1.

FIG. 8 is a side elevation view taken on line 8—8 of FIG. 4.

FIG. 9 is a front elevation view of a visor.

FIG. 10 is a bottom view taken on line 10—10 of FIG. 9.

FIG. 11 is a rear elevation view taken on line 11—11 of FIG. 10.

FIG. 12 is a top view taken on line 12—12 of FIG. 11.

FIG. 13 is a perspective view taken on line 13—13 of FIG. 12.

FIG. 14 is a side elevation view of a temple piece.

FIG. 15 is an end elevation view taken on line 15—15 of FIG. 14.

FIG. 16 is a top view taken on line 16—16 of FIG. 14.

FIG. 17 is a side elevation view illustrating an alternative embodiment of the visor.

FIG. 18 is a front elevation taken on line 18—18 of FIG. 17.

FIG. 19 is a side elevation view illustrating a modified configuration of the mounting tabs on the lens piece for producing a snap-action rotation of a temple bar to its open position.

FIG. 20 is an elevation view taken on line 20—20 of FIG. 19.

FIG. 21 is an elevation view taken on line 21—21 of FIG. 19.

FIG. 22 is a fragmentary side elevation showing the outer face of the modified hinge post mounting means at the front of the temple bar.

FIG. 23 is an elevation view rotated 180° with respect to FIG. 22.

FIG. 24 is a fragmentary elevation view taken on line 24—24 of FIG. 23.

FIG. 25 is an elevation view taken on line 25—25 of FIG. 23.

FIG. 26 is a fragmentary elevation view taken on line 26—26 of FIG. 23.

FIG. 27 is a fragmentary elevation view taken on line 27—27 of FIG. 23.

FIG. 28 is a fragmentary side elevation view illustrating assembly of a temple bar mounting post to a mounting tab at the corner of the lens piece.

FIG. 29 is a fragmentary elevation view taken on line 29—29 of FIG. 28.

FIG. 30 is an elevation view showing the temple bar rotated away from the view shown in FIG. 29.

FIG. 31 is a fragmentary elevation view showing the temple bar rotated to its open position.

FIG. 32 is an elevation view taken on line 32—32 of FIG. 31.

FIG. 33 is a semi-schematic top elevation view showing an alternative configuration of the visor piece.

DETAILED DESCRIPTION

Figure 3:
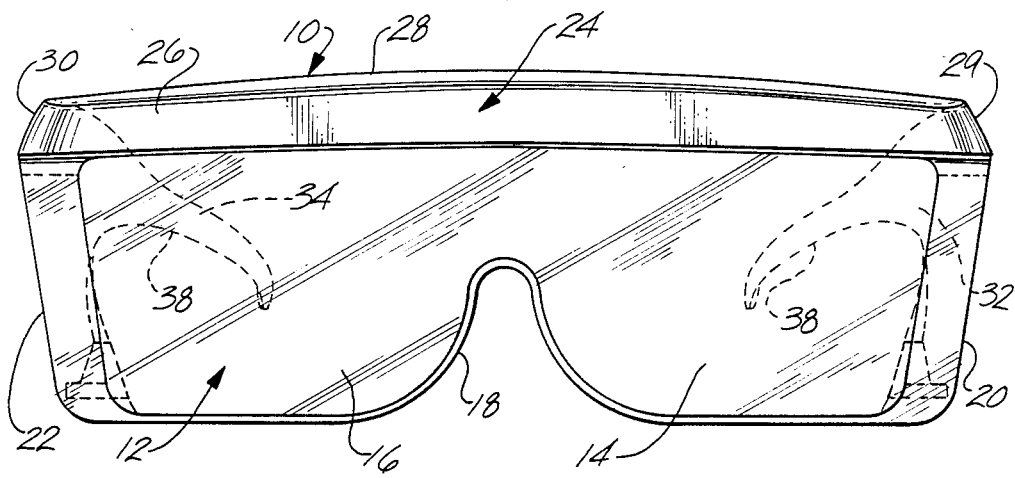
FIG. 3 is a front elevation view of the sunglasses shown in FIG. 1.
Figure 4:
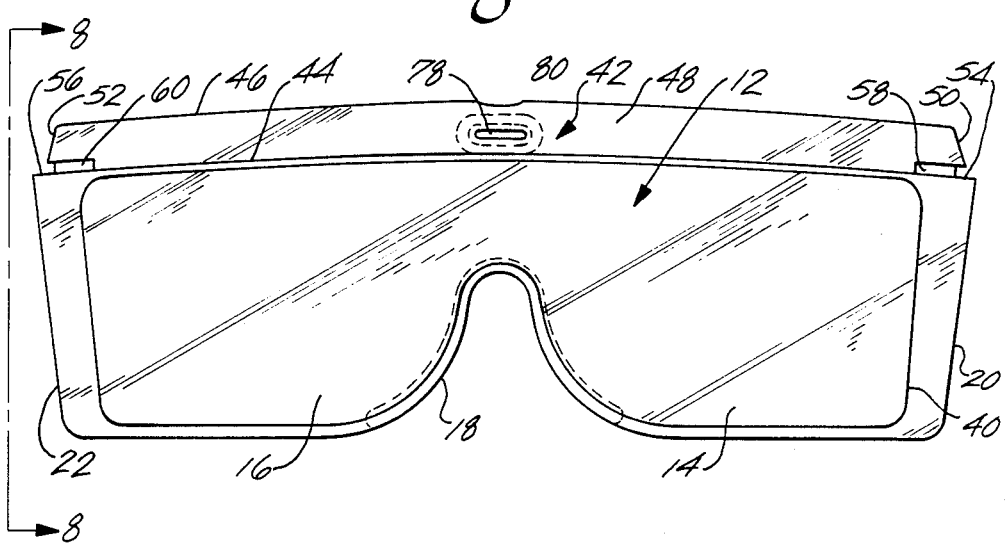
FIG. 4 is a front elevation view of a lens piece.
Figure 6:
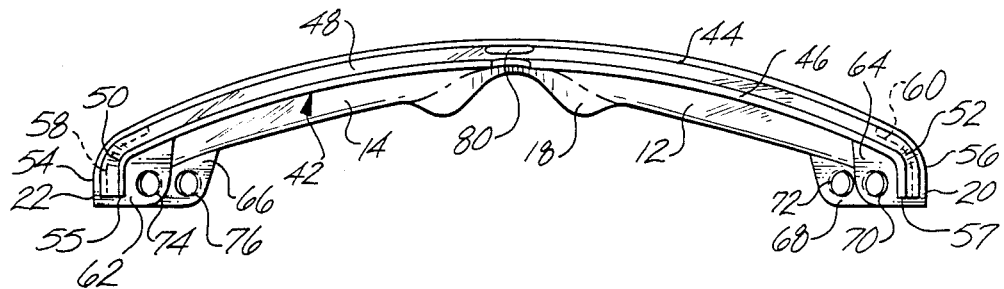
FIG. 6 is a top view taken on line 6—6 of FIG. 5.
Figure 5:
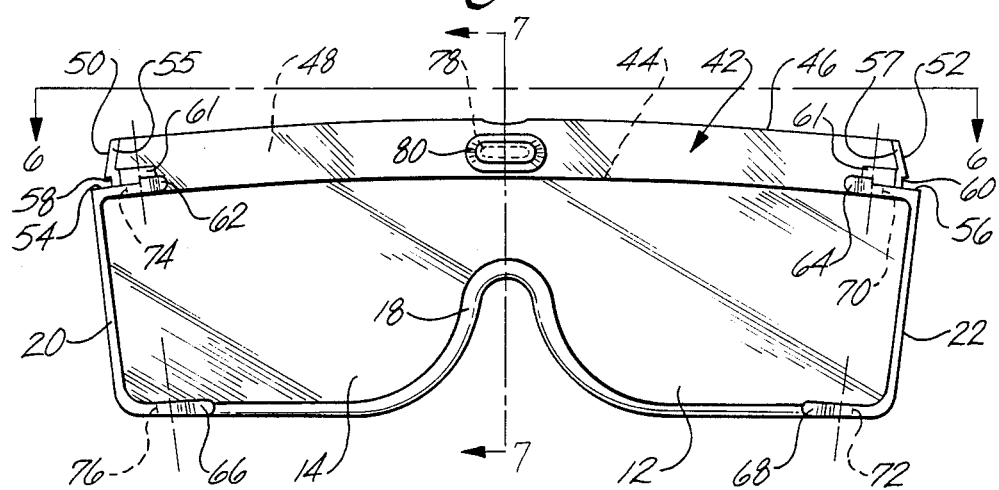
FIG. 5 is a rear elevation view of the lens piece.
Figure 7:
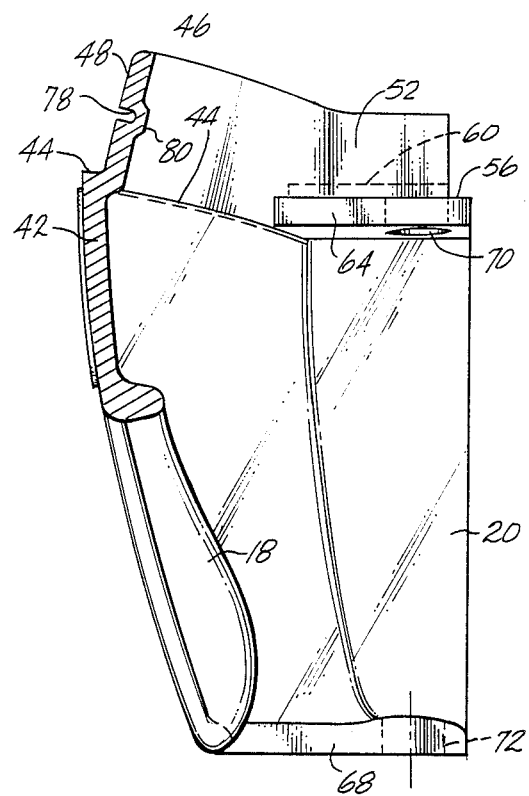
FIG. 7 is a cross-sectional view taken on line 7—7 of FIG. 5.

FIGS. 1 through 3 illustrate multi-component plastic sunglasses 10 in their assembled form. The sunglasses include an elongated curved lens piece 12 having a continuous raised optical surface with left and right lens areas 14 and 16 on opposite sides of a recessed nose piece 18. The lens piece is curved lengthwise to match the contour of the user's face, in the usual manner, so that the left and right lens areas can be positioned in the left and right eye field of vision when the glasses are worn. The nose piece has a flanged inverted U-shaped nose rest which also adds rigidity to the lens piece. The lens piece has generally L-shaped left and right wraparound ends 20 and 22 also adding rigidity to the ends of the lens piece.

An elongated curved visor piece 24 is releasably fastened to a top portion of the lens piece with an interlocking snap fit. The visor piece has an upright front face 26 for extending across the top front of the glasses above the optical area. An elongated top face 28 of the visor piece extends at an angle inwardly from the front face of the visor piece, over the top edge of the lens piece. The visor piece also has generally L-shaped left and right wraparound ends 29 and 30 located above the wraparound ends of the lens piece.

A pair of elongated left and right temple pieces or temple bars 32 and 34 are releasably attached to upper and lower inside portions of the left and right wraparound ends of the lens piece. The temple pieces have a wide front end portion 36 with a raised surface. The front end of each temple piece has the same height as the adjacent wraparound end portions of the lens piece and the attached visor piece. The bottom end portions of the temple pieces are narrowed down to form recessed ear mounting sections 38.

The lens piece and the temple pieces are preferably injection molded from a transparent bendable hard plastic material such as optical quality polycarbonate. The lens piece and temple pieces are preferably tinted with an appropriate color to reduce transmission of light to the eyes of the wearer. The visor piece is preferably made by injection molding it from an opaque bendable plastic material such as polycarbonate. The plastic lens piece and visor piece are both bendable sufficiently so that their ends can be flexed inwardly toward one another with the lens piece and visor recovering their original shape when the bending force is released. Both pieces also are resiliently bendable in torsion.

The visor piece provides an opaque upright wall of essentially uniform width across the entire front portion of the lens piece immediately above the lens areas, with the opaque visor also extending over the top of the glasses and projecting inwardly away from the inside face of the glasses. The opaque visor blocks the intense sun rays from the top that would normally pass through the space between the upper inside edge of the glasses and the user's face and also through the top of the glasses immediately above the eyes. The opaque visor thereby blocks a substantial amount of light to provide greatly improved comfort for the eyes when exposed to the intense rays of the sun. In addition, the opaque visor piece can be attached or unfastened from the top of the glasses and thereby provide a means for interchanging the visor piece in various colors to match or contrast the color of the glasses, if desired.

The visor piece is releasably attachable to the top of the lens piece in an extremely tight snap-on fit which avoids the visor piece from loosening or falling off of the lens piece. The visor piece remains in a fixed position without loosening even when the lens piece is subjected to extreme amounts of bending or twisting. However, the visor piece can be easily removed from the lens piece, if desired, by prying the two pieces apart with oppositely directed forces applied without the need for any special tools or the like.

Detailed construction of the various components of the sunglasses will now be described.

FIGS. 4 through 8 illustrate construction of the lens piece 12. The raised optical area extends over most of the front surface of the lens piece. The border of the optical area is shown best at 40 in FIG. 4. An elongated visor connector member 42 extends across a top portion of the lens piece. The visor connector member is recessed with respect to the front plane of the lens area, behind an elongated ridge 44 extending across the front of the lens piece below the visor connector member. The visor connector member is preferably of substantially uniform length from end-to-end, having a top edge 46 spaced above and extending substantially parallel to the ridge 44, preferably about one-half inch above the ridge. The visor connector member also includes an elongated curved front face matching the curvature of the lens area, together with upwardly and inwardly angled wraparound end walls 50 and 52 at left and right ends of the member. The end walls 50 and 52 are L-shaped (see FIG. 6) and match the L-shaped contour of the left and right wraparound ends 20 and 22 of the lens piece. The ridge 44 extends continuously across the front of the visor connector member, and the ridge has corresponding left and right L-shaped end surfaces 54 and 56 at the bottom front of the L-shaped ends of the visor connector member. Left and right rear edges 55 and 57 of the visor connector member extend above the L-shaped end surfaces of the ridge. As shown best in FIG. 7, the visor connector member is preferably spaced to the rear of and extends upwardly and inwardly at an angle with respect to the lens area of the lens piece.

A pair of left and right connector slots 58 and 60 are formed at the bottom end portions of the visor connector member. These slots are of narrow profile and are located on the front face of the visor connector member immediately above the top surface of the ridge 44. More specifically, the slots are each generally L-shaped to match the contour of the L-shaped ends of the visor connector member, and the base of each slot is in the same plane as the upper surface of the L-shaped end portion of the adjacent ridge. The inner end of each slot (on the front side of the visor connector member) terminates a short distance from the corner of the visor connector member. The opposite ends of the slots open outwardly toward the rear of the lens piece, below the rear edges 55 and 57 of the visor connector member. The L-shaped slots 58 and 60 are thus formed underneath the L-shaped ends of the visor connector member immediately above the L-shaped end portions of the ridge which extends across the upper portion of the lens piece. The indentation formed by each slot leaves an inwardly projecting shoulder 61 on the inside ends of the visor connector member.

Mounting tabs for the temple pieces 32 and 34 are formed on the upper and lower inside corners of the lens piece. The mounting tabs include left and right upper mounting tabs 62 and 64 integrally formed with the lens piece immediately below the connector slots 58 and 60. The upper surfaces of the upper mounting tabs are essentially in the same plane as the ridge 44 and its L-shaped end surfaces 54 and 56. The mounting tabs for the temple pieces also include left and right lower mounting tabs 66 and 68 integrally formed on the lower inside corners of the lens piece. A pair of upper and lower holes 70 and 72 in the right upper and lower tabs are aligned on a common axis extending at an angle of about 15° relative to vertical. Similarly, a pair of upper and lower holes 74 and 76 in the left upper and lower tabs are also aligned on a common axis extending at the same angle.

The front face of the visor connector member 42 has an elongated recessed slot 78 extending parallel to and spaced above the ridge 44. The slot 78 is formed so it faces outwardly at the front center of the connector member. The area around the slot on the inside of the member is widened at 80 to add rigidity around the perimeter of the slot.

FIGS. 9 through 13 illustrate detailed construction of the visor piece 24. The curved front face 26 of the visor piece matches the curvature and angular orientation of the front wall 48 of the visor connector member 42. The height of the front face of the visor piece matches the height of the visor connector member from end-to-end. The L-shaped ends 29 and 30 of the visor piece match the L-shaped contour of the wraparound ends of the visor connector member. The top face 28 of the visor piece extends inwardly at an angle from the front face of the visor piece. The top face 28 of the visor piece has generally L-shaped left and right wraparound end portions 82 and 84 above corresponding left and right wraparound side wall portions 29 and 30 of the visor piece. Hooks 86 and 88 are formed at the base of each wraparound wall, and the hooks extend into the interior of the visor. The base of each hook is continuous with the bottom edge of the visor piece, as shown best in FIG. 11. Separate L-shaped shoulders 90 and 92 extend in front of the left and right hooks 86 and 88. These shoulders are located at the bottom inside corners of the visor piece. The bottom surfaces of the shoulders are continuous with the bottom edge of the visor piece, and each shoulder projects into the interior of the visor piece by a uniform distance from end-to-end. The width of each shoulder is less than the length of its corresponding hook so that the hook projects farther into the interior of the visor piece than its adjacent shoulder.

An elongated tab 94 projects inwardly from the front inside face of the visor piece. The tab is parallel to and spaced above the bottom edge of the visor piece. The tab is arranged so that it snap locks into engagement with the slotted recess 78 on the front wall of the visor connector member 42.

FIGS. 14 through 16 illustrate detailed construction of the temple pieces 32 and 34. The figures illustrate the right temple piece 34. The left temple piece 32 is of identical but reverse configuration. As to the detailed construction of the right temple piece 34, flanged upper and lower walls 96 and 98 are integrally formed with the widened front end of the temple piece. These upper and lower walls taper wider toward the front of the temple piece and provide rigidity for the temple piece. The widened front end of the upper wall 96 has about the same width as the L-shaped ends of the visor piece, and the lower wall 98 has about the same width as the lower tabs on the visor piece for holding the temple pieces. The widened front end of the temple piece also has a short front wall integrally formed with the upper wall 96 and with the front end of the side wall of the temple piece. An upper mounting post 102 is formed integrally with and extends to the front of the front wall 100. The post 102 extends upwardly from the remote end of a leg 104 which holds the post on the bottom of the front wall 100. The widened front end of the temple piece also has a short bottom wall which is integrally formed with the lower wall 98 and the side wall of the temple piece. A lower mounting post 108 projects in front of the lower wall 106. The lower mounting post 108 projects downwardly from the end of a leg 110 which holds the post spaced in front of the lower wall 106. The upper and lower mounting posts are aligned on a common axis, and the posts are adapted to fit into the mounting holes on the tabs of the lens piece for releasably attaching the temple pieces to the ends of the lens piece. The temple pieces have a slight amount of flexibility in the upright direction so that the mounting posts can be forced toward one another by a short distance under pressure applied to the front ends of the temple piece. This provides a means for fitting the posts into the space between their corresponding mounting tabs, whereupon a release of the bending force causes the mounting posts to register with the holes in the mounting tabs to securely fasten the temple pieces to the ends of the lens piece.

In using the sunglasses, the visor piece 24 is releasably attached to the visor connector member 42 by first fitting the hook 86 at one end of the visor piece behind the rear edge 55 of the visor connector member, so that the shoulder 90 in front of the hook 86 fits into the L-shaped slot 58 at the base of the visor connector member wall. The bottom edge of the L-shaped corner of the visor piece rests on the L-shaped upper surface 54 at the end of the ridge 44 which extends across the front of the lens piece. One end of the visor piece is thereby confined within the end of the connector member so that the end of the visor is prevented from moving up or down relative to the end of the visor connector member. At the opposite end of the visor piece, the hook 88 is placed behind the rear edge 57 of the visor connector wall near the top of the rear edge. This positions the shoulder 92 in front of the hook on the outside face of the visor connector wall. This end of the visor is then pushed downwardly toward the slot 60 at the corner of the visor connector wall so that the hook 88 rides down along the ramp-like rear edge of the visor connector wall, while the shoulder in front of the hook rides down along the ramp-like outside face of the wall. This increases the tension between the visor piece and the visor connector member as the visor piece is pushed down toward the connector slot 60 at the base of the wall. Continued downward force finally causes the shoulder 92 in front of the hook 88 to snap into engagement with the connector slot 60. The hook behind the shoulder is held under slight tension adjacent the bottom rear edge 57 of the visor connector member wall. The flexibility of the plastic material achieves this snap lock function.

In the locked position of the visor, the bottom of the hook 88 rests on the L-shaped upper face 56 of the ridge 44, and the shoulder in front of the hook is held tightly in place in the connector slot. The inside face of the visor wall 26 is held firmly against the outside face of the visor connector wall. The bottom edge of the visor piece is held firmly against the upper surface of the ridge 44. In addition, the tab 94 at the front center of the visor piece is engaged with the slot 78 at the front face of the visor connector member. Normally, a slight amount of downward force applied to the top center of the visor piece snap locks the shoulder into engagement with the slot. Engagement of the front shoulder and slot provides a means for preventing movement of the visor upwardly relative to the visor connector wall.

The connecting means at opposite ends of the visor piece provide an effective means of holding the visor piece in a fixed position without any movement relative to the visor connector member. The visor can be easily removed from the visor connector member owing to the flexibility of the plastic materials. The end of the visor piece can be simply pried outwardly away from the shoulder and end of the visor connector member wall to release the hook from its engagement with the wall and thereby provide a means for sliding the end of the visor away from the end connector.

FIGS. 17 and 18 illustrate an alternate embodiment of the visor piece. In this embodiment, the sunglasses include the same lens piece 12' with identical temple pieces 32'. The visor piece is modified to comprise a visor 112 having an outwardly projecting lens shade 114 extending horizontally across the top of the visor 112. Otherwise, the ends of the visor piece 112 snap lock into engagement with the visor connector member on the lens piece 12' in the same manner as described above.

FIGS. 19 through 32 illustrate components of a system for providing a spring-like snap action to the temple bars as they rotate outwardly to the open position. When a user unfolds the temple bars 32 and 34 to the open position, as shown in FIG. 1, it is desirable for the temple bars to be held in the open position with resistance against rotation back toward their folded position. If the temple bars are easily movable away from the open position, then the ends of either temple bar can poke the user in the eye when the user is putting on the sunglasses.

This problem is overcome by the snap action system of mounting the temple bars to the sides of the lens piece. Briefly, the snap action is produced by modifying the mounting tabs on opposite sides of the lens piece to provide ramp surfaces which cooperate with modified ramp surfaces on the upper and lower legs of the mounting posts at the front ends of the temple bars. By rotating the ramp surfaces on the temple posts into contact with the ramp surfaces on the mounting tabs of the lens piece, as the temple bars are being rotated from the folded position toward their open position, the temple bars will snap outwardly to the open position with a spring-like action and remain in the open position with a spring-like resistance against movement back toward the folded position.

The preferred snap-action system for mounting the temple bars to the lens piece is best understood by first referring to FIGS. 19 through 21, which show a right end portion 200 of the lens piece with modified upper and lower mounting tabs 202 and 204. A similar system of modified mounting tabs is used on the left side of the lens piece, but is not shown for simplicity. The upper mounting tab 202 projects inwardly from the right corner of the lens piece and has a widened outer portion 206 remote from the front wall of the lens piece. This widened outer portion of the mounting tab extends inwardly from the outer edge of the tab toward a straight ridge 208 on the underside of the tab, which extends across a portion of the mounting hole 210 through the mounting tab. A long, narrow upper ramp surface 212 extends upwardly at an angle along the undersurface of the mounting tab toward the end of the lens piece. The ramp surface 212 extends across the bottom of the mounting tab, generally along a path extending on opposite sides of the mounting hole 210. The ramp surface 212 tapers toward a long, straight edge 214 at the base of the ramp, which then transitions into the flat bottom surface of the main portion of the mounting tab, adjacent the front wall of the lens piece.

The lower mounting tab 204 has a similar ramp surface facing upwardly toward the upper ramp surface 212. The lower mounting tab 204 projects inwardly from the lower right corner of the lens piece and has a widened outer portion 216, an upper ridge 218 extending across an outer portion of the mounting hole 220, a ramp surface 222 extending downwardly, generally across both sides of the mounting tab on opposite sides of the mounting hole, terminating in a lower ridge 224 at the bottom of the ramp surface 222.

The ramp surfaces on the mounting legs of the temple bars are best understood by referring to FIGS. 22 through 27. FIG. 22 illustrates the outer side of the right temple bar 226 with its upper and lower temple bar mounting legs 228 and 230 at its front edge. Upper and lower hinge posts 232 and 234 project upwardly and downwardly, respectively, above and below the ends of the upper and lower mounting legs. In this view, upper and lower ramp surfaces are on the opposite sides of the upper and lower mounting legs, and these ramp surfaces are shown at 236 and 238, respectively.

The inside face of the right temple bar 226 is shown in FIG. 23, which also illustrates front views of the ramp surfaces 236 and 238 on the upper and lower mounting legs 228 and 230 of the upper and lower hinge posts, respectively.

The side view of FIG. 24 shows that the upper mounting leg 228 has a widened section with a flat top surface 240 near the outer side of the temple bar. The ramp surface 236 extends downwardly at an angle away from the flat top surface of the leg toward the inside of the temple bar. Similarly, the lower mounting leg 230 has a widened section with a flat bottom surface 242, and the lower ramp surface 238 extends upwardly at an angle away from the flat bottom surface of the leg toward the inside of the temple bar.

FIG. 26 is a top view of the ramp surface 236 and FIG. 27 is a bottom view illustrating the lower ramp surface 242.

FIGS. 28 through 32 illustrate assembly and use of the snap action temple bars. FIG. 28 is a side view illustrating the folded position of the right temple bar with the upper hinge post 232 of the upper mounting leg 228 inserted into the mounting hole 210 in the upper mounting tab 202 on the right side of the lens piece. FIG. 29 is a top view of the assembly shown in FIG. 28. The bottom connections of the temple bars and the connections between the left temple bar and the left side of the lens piece are not shown for simplicity, inasmuch as their functions are similar to those illustrated in FIGS. 28 through 32. Each temple bar is assembled to an end of the lens piece by inserting the hinge posts 232 and 234 into the mounting holes 210 and 220 at the corner of the lens piece. During assembly, the sides of the temple bars must be flexed to shorten the distance between the opposite ends of the hinge posts so that they can fit between the upper and lower mounting tabs for alignment with the mounting holes. The temple bars are made from a semi-rigid plastic material which allows each temple bar to be flexed by hand pressure to shorten its vertical dimension sufficiently to insert the hinge posts into the space between the mounting holes. Once the hinge posts are aligned with the mounting holes, the applied pressure is released and the hinge posts snap into engagement with the mounting holes. Inasmuch as the unstressed vertical distance between the hinge posts is normally greater than the corresponding vertical distance between the mounting tabs, when the hinge posts are snapped into engagement with the mounting holes, there remains a constant upward and downward spring force naturally applied to the upper and lower mounting tabs by the hinge posts. This pressure retains the hinge posts in the mounting holes without any lost motion.

FIG. 28 shows the right temple bar 226 in its folded position in which the upper hinge post 232 is inserted into the mounting hole 210 of the upper mounting tab 206. In this folded configuration of the temple bar, shown in FIGS. 28 and 29, the flat top surface 240 of the post mounting leg 228 engages the bottom of the upper mounting tab 206. These engaging portions of the post mounting leg 228 and the upper mounting tab 206 are at their widened portions, which causes the leg 228 to be naturally pushed upwardly with a spring force by the natural flexibility of the semirigid, plastic temple bar. The flat bottom surface 242 of the lower post mounting leg 238 also is pressed into pressure contact with the widened bottom portion 216 of the lower mounting tab so that, in the folded position, the hinge post mounting legs apply upward and downward spring pressure to their means of connection to the ends of the lens piece. FIG. 29 shows that in the folded position of the temple bar 226, the ramp surfaces 212 and 236 on the mounting tab and on the hinge post mounting leg, respectively, are at right angles to one another and, therefore, are not in contact. The ramp surfaces are cross-hatched for clarity.

FIG. 30 shows an intermediate position of the temple bar 226 rotating from a folded position of FIG. 29 toward its open position. In the partially open position shown in FIG. 30, the ramp surface 236 on the hinge post mounting leg 228 is rotating toward the ramp 212 on the underside of the lens piece mounting tab 202. In this position, the widened portions of the upper and lower hinge post mounting legs are still in spring-like pressure contact with the adjacent widened portions of the upper and lower temple bar mounting tabs. The ramp surfaces on the mounting tab and on the temple bar mounting leg are cross-hatched for clarity.

Once the temple bar reaches the partially opened position shown in FIG. 30, further outward rotation of the temple bar, in the direction of the arrow in FIG. 30, ultimately causes the temple bars to snap outwardly with a spring action, to the open position of the temple bars shown in FIGS. 31 and 32. As manual pressure is applied to the temple bar to rotate it outwardly toward its open position, the ramp surface 236 on the hinge post mounting leg 228 eventually comes into contact with the ramp surface 212 on the underside of the upper mounting tab; and once the two ramp surfaces engage one another, the upward spring pressure of the semi-flexible plastic material in the temple bar post and mounting leg causes the two ramp surfaces to be quickly forced into contact with one another. This causes the ramp on the hinge post mounting leg to rapidly slide down the ramp on the mounting tab and automatically force the temple bar to rotate rapidly, outwardly with a snap action. FIG. 3 shows the cross-hatched engaged portions of the ramp surfaces. The temple bar is held in its open position by engagement of the end surfaces 250 and 252 of the lens piece and the mounting tab. These surfaces engage one another to act as a stop. While the temple bar is in the open or stop position, there is still a modest amount of spring pressure applied naturally (from the resilience of the plastic) between the upper and lower mounting legs on the temple bar and their cooperating connections to the upper and lower mounting tabs on the lens piece. This presents lost motion and resists backward rotation of the temple bars.

Thus, the user can easily rotate the temple bars from the folded position to the open position by a slight amount of outward pressure and by rotating each temple bar about half way to its open position. The ramp surfaces then engage one another and automatically snap the temple bars to the open position. The temple bars are both held in a fixed position in the open position by the retained spring force between the temple bar hinge post mounting legs applying pressure to their cooperating mounting tabs on the lens piece.

The snap-action temple bar system has been described in relation to a preferred arrangement in which the cooperating cam surfaces are on both the upper and lower temple bar posts and lens piece mounting tabs. Alternatively, the snap-action system can be provided with the cooperating cam surfaces being on either the upper or lower temple bar posts and lens piece mounting tabs.

FIG. 33 shows an alternate configuration of the visor piece 254 in which the upper lip 255 of the visor piece can be modified with respect to the configuration shown in FIG. 12, so that its inwardly projecting opaque ends of the visor piece are shown to extend inwardly further from the top of the lens piece to provide a greater amount of light blockage in the regions shown at 256 and 257 near the connection of the lens piece to the temple bars 258 and 260. This provides a highly effective means of intercepting the light at the upper corners of the sunglasses where light would otherwise enter the user's eyes from above.

What is claimed is:

1. Sunglasses comprising:
   an elongated unitary lens piece extending along a curved path and having an optical area to extend over a user's left and right eye fields of vision;
   the lens piece being from a bendable plastic material which is transparent to light at least in the optical area thereof;
   said lens piece being adapted for mounting in the user's field of vision by left and right temple pieces attached to the lens piece;
   an elongated curved visor piece made from an opaque, bendable plastic material, the visor piece having means to snap lock it into a fixed position atop the lens piece;
   a visor connector member integrally formed with and extending across the top of the lens piece from one upper corner to another upper corner of the lens piece;
   the visor connector member comprising (a) an elongated curved upright front wall extending across the front of the lens piece with generally L-shaped ends at the upper corners of the lens piece, said upright front wall being recessed from the lens area to form an elongated ridge with L-shaped ends at the bottom front side of said upright wall; (b) a separate narrow slot formed in the bottom outer face of the L-shaped ends of the front wall above the ridge; and (c) a separate flat base surface extending away from a top surface of the ridge behind an upright rear edge at each end of the upright front wall, so that each slot extends in front of each base surface;
   the visor piece comprising (1) an elongated curved front face with generally L-shaped ends matching the curvature and shape of the front wall of the visor connector section; (2) a narrow elongated curved top face extending along the top and projecting upwardly at an angle to said front face; (3) a separate hook at the bottom of each L-shaped end of the visor front face, each hook projecting inwardly in the same general direction as the top face of the visor piece; and (4) a separate shoulder projecting inwardly at the bottom of each L-shaped end of the visor piece front face, in front of each hook;
   the visor piece being interlocked with said visor connector by engaging each shoulder of the visor piece in a corresponding slot on the visor connector front wall, with each hook of the visor resting on the base surface behind it, and engaged with each upright rear edge of the front wall of the visor connector,
   so that the front face of the visor piece overlies the front wall of the visor connector with the bottom of the visor piece resting on said ridge and with the face of the visor piece extending over and projecting inwardly from the top edge of the front wall on the lens piece, said upper face of the visor extending inwardly a sufficient distance to prevent light rays from entering the space between the top of the lens piece and the user's face.

2. Apparatus according to claim 1 including a cooperating shoulder and groove between a central portion of the overlying faces of the visor piece and the front wall of the visor connector member.

3. Apparatus according to claim 1 in which each shoulder is L-shaped to match an L-shaped configuration of each corresponding slot in the front wall of the visor connector.

4. Apparatus according to claim 1 in which the visor piece snap-locks onto the visor connector by inserting one shoulder into a corresponding slot at one end of the visor connector member, and sliding the hook at the other end of the visor piece down along the rear edge of the visor connector wall while sliding the adjacent shoulder of the visor down along the visor connector wall, until downward pressure snap-locks the shoulder in the slot with the hook held against the adjacent rear edge of the wall of the visor connector.

5. Apparatus according to claim 1 in which the visor piece includes an outwardly projecting lens shade.

6. Sunglasses comprising:
   an elongated unitary lens piece made from a bendable plastic material which is transparent to light passing through an optical area of the lens piece;
   said lens piece being adapted for mounting in a user's field of vision by left and right temple pieces attached to the lens piece;
   an elongated opaque visor made from a bendable plastic material and having connector means at its ends to snap-lock it into a fixed position atop the lens piece;
   a visor connector member having an upright front wall extending across the front of the lens piece and recessed behind an elongated ridge extending across the lens piece below the wall, and a separate connector slot at the base of the visor connector member near each rear edge of the wall;
   a separate hook at each end of the visor projecting inwardly from an inside wall of the visor and a corresponding shoulder extending inwardly in front of each hook;
   the visor being interlocked with the visor connector by engaging each shoulder of the visor with a corresponding slot on the visor connector wall, with each hook of the visor being engaged with each rear edge of the visor connector wall, so that the front face of the visor overlies the front wall of the visor connector member, with the bottom of the visor resting on said ridge and with a top face of the visor extending over and projecting inwardly from the top edge of the front wall of the visor connector, the top face of the visor extending inwardly a sufficient distance to prevent light rays from entering the space between the top of the lens piece and the user's face while the opacity of the visor blocks light rays from the eyes of the user.

7. Apparatus according to claim 6 including a cooperating shoulder and groove between a central portion of the overlying faces of the visor piece and the front wall of the visor connector.

8. Apparatus according to claim 6 in which each shoulder is L-shaped to match an L-shaped configuration of each corresponding slot in the front wall of the visor connector.

9. Apparatus according to claim 6 in which the visor piece snap-locks onto the visor connector by inserting one shoulder into a corresponding slot at one end of the visor connector member, and sliding the hook on the other end of the visor piece down along the rear edge of the visor connector wall while sliding the adjacent shoulder of the visor down along the visor connector wall, until downward pressure snap-locks the shoulder in the slot with the hook held against the adjacent rear edge of the wall of the visor connector.

10. Apparatus according to claim 6 in which the visor piece includes an outwardly projecting lens shade.

11. Sunglasses comprising:
an elongated unitary lens piece made from a bendable plastic material which is transparent to light passing through an optical area of the lens piece;
said lens piece being adapted for mounting in a user's field of vision by left and right temple pieces attached to ends of the lens piece;
the ends of the lens piece having left and right temple piece connectors projecting inwardly from and behind an upright front face of the lens piece, the left and right temple pieces being attachable to the corresponding left and right temple piece connectors, respectively;
an elongated opaque visor made from a bendable plastic material and having connector means at its ends to snap-lock it into a fixed position atop the lens piece;
the lens piece having cooperating connector means at its ends for interlocking with the connector means on the visor for holding the ends of the visor on the lens piece;
the lens piece having means for retaining the visor in a fixed position on the lens piece, resisting relative movement when the connector means at the ends of the visor are interlocked to the connector means at the ends of the lens piece; in which the visor has a top face which is integrally formed with the visor and extends across the top and projects inwardly from a front top edge of the visor and in which the visor top face extends over and is spaced above the connector means on the visor, said inward projection of the visor top face being spaced above and continuous between the connections of the left and right temple pieces to the left and right temple piece connectors at the ends of the visor piece sufficient to prevent light rays from entering the space between the top of the lens piece and the user's face across the entire top of the sunglasses so that the opacity of the visor blocks light rays from the eyes of the user.

12. Apparatus according to claim 11 in which the cooperating connector means at each end of the lens piece and visor provide releasable frictional connections made without the use of extraneous tools for locking or unlocking the connections.

13. Apparatus according to claim 11 in which the cooperating connector means at the end of the lens piece and visor comprise a cooperating shoulder and groove connection in which the shoulder is biased under tension by the flexibility of the plastic material for snaplocking engagement with the groove.

14. Apparatus according to claim 13 in which the connector means at the end of the lens piece and visor further includes a hook on the visor extending behind a wall on the lens piece to prevent forward movement of the visor relative to the lens piece.

15. Apparatus according to claim 14 including a cooperating shoulder and groove between central overlying faces of the visor and lens piece.

16. Apparatus according to claim 11 in which the visor includes an outwardly projecting lens shade.

17. Sunglasses according to claim 11 in which the temple pieces include inwardly projecting top faces continuous with the top face of the visor, when the sunglasses are worn, to provide a further means of blocking light rays from the eyes of the user.

18. Sunglasses comprising:
an elongated unitary lens piece made from a bendable plastic material which is transparent to light passing through an optical area of the lens piece, said lens piece being adapted for mounting in a user's field of vision by left and right temple pieces attached to ends of the lens piece;
an elongated opaque visor made from a bendable plastic material and having connector means at its ends to snap-lock it into a fixed position atop the lens piece, the lens piece having cooperating connector means at its ends for interlocking with the connector means on the visor for holding the ends of the visor on the lens piece, in which the visor includes an outwardly projecting lens shade;
the lens piece having means for retaining the visor in a fixed position on the lens piece, resisting relative movement when the ends of the visor are interlocked to the lens piece; and in which a top face of the visor extends over and projects inwardly from a front top edge of the lens piece, and extends over and projects inwardly from the connector means, said inward projection of the visor top face being continuous between the connections of the temple pieces to the ends of the visor piece sufficient to prevent light rays from entering the space between the top of the lens piece and the user's face across the entire top of the sunglasses so that the opacity of the visor blocks light rays from the eyes of the user.

19. Sunglasses comprising:
an elongated unitary lens piece made from a bendable plastic material which is transparent to light passing through an optical area of the lens piece, said lens piece being adapted for mounting in a user's field of vision by left and right temple pieces attached to ends of the lens piece;
an elongated opaque visor made from a bendable plastic material and having left and right connector means at its ends to snap-lock it into a fixed position atop the lens piece;
a visor connector member having an upright front wall extending across the front of the lens piece and recessed behind an elongated ridge extending across the lens piece below the front wall and above the optical area of the lens piece;
the lens piece having separate left and right connector means at the ends of said connector member above the ridge adapted to frictionally engage the corresponding left and right connector means on the visor;
the visor being snap-locked into said fixed position atop the lens piece by frictionally engaging the left and right connector means of the visor and lens piece connector member in a friction fit that retains the visor on the lens piece connector member above the elongated ridge continuously across the front of the lens piece.

20. Sunglasses according to claim 19 in which the visor has a top face which is integrally formed with the visor and extends across the top and projects inwardly from a front top edge of the visor and in which the visor top face extends over and projects inwardly and is spaced above the connector means on the visor, the inward projection of the visor top face being spaced above and continuous between the connections of the temple pieces to the ends of the visor piece sufficient to prevent light rays from entering the space between the top of the lens piece and the user's face across the entire top of the sunglasses so that the opacity of the visor blocks light rays from the eyes of the user.

21. Sunglasses according to claim 19 in which the cooperating connector means at the ends of the lens piece and visor provide releasable, frictional connections made without the use of extraneous tools for locking or unlocking the connections.

22. Sunglasses according to claim 19 in which the cooperating connector means at the ends of the lens piece and visor comprise a cooperating shoulder and groove connection in which the shoulder is biased under tension by the flexibility of the plastic material for snap-locking engagement with the groove.

23. Sunglasses according to claim 22 in which the connector means at the end of the lens piece and visor further includes a hook on the visor extending behind a wall on the lens piece connector member to prevent forward movement of the visor relative to the lens piece connector member.

24. Sunglasses according to claim 23 including a cooperating shoulder and groove between central overlying faces of the visor and lens piece.

25. Sunglasses according to claim 19 in which the temple pieces include inwardly projecting top faces continuous with the top face of the visor, when the sunglasses are worn, to provide a further means of blocking light rays from the eyes of the user.

* * * * *

UNITED STATES PATENT AND TRADEMARK OFFICE
CERTIFICATE OF CORRECTION

PATENT NO. : 4,976,530
DATED : December 11, 1990
INVENTOR(S) : Frederick G. Mackay; William J. Wichman It is certified that error appears in the above-identified patent and that said Letters Patent is hereby corrected as shown below:

ON TITLE PAGE:

[56] References Cited, line 3, change "D. 294,592" to
-- D. 294,952 --.

OTHER PUBLICATIONS, line 1, change "M--A" to -- M-S-A --.

Signed and Sealed this

Twenty-sixth Day of May, 1992

Attest:

DOUGLAS B. COMER

*Attesting Officer*     *Acting Commissioner of Patents and Trademarks*